March 27, 1928.
W. C. PITTER
1,664,320
CLUTCH FOR TRANSMITTING ROTARY MOTION
Filed March 25, 1927    2 Sheets-Sheet 1
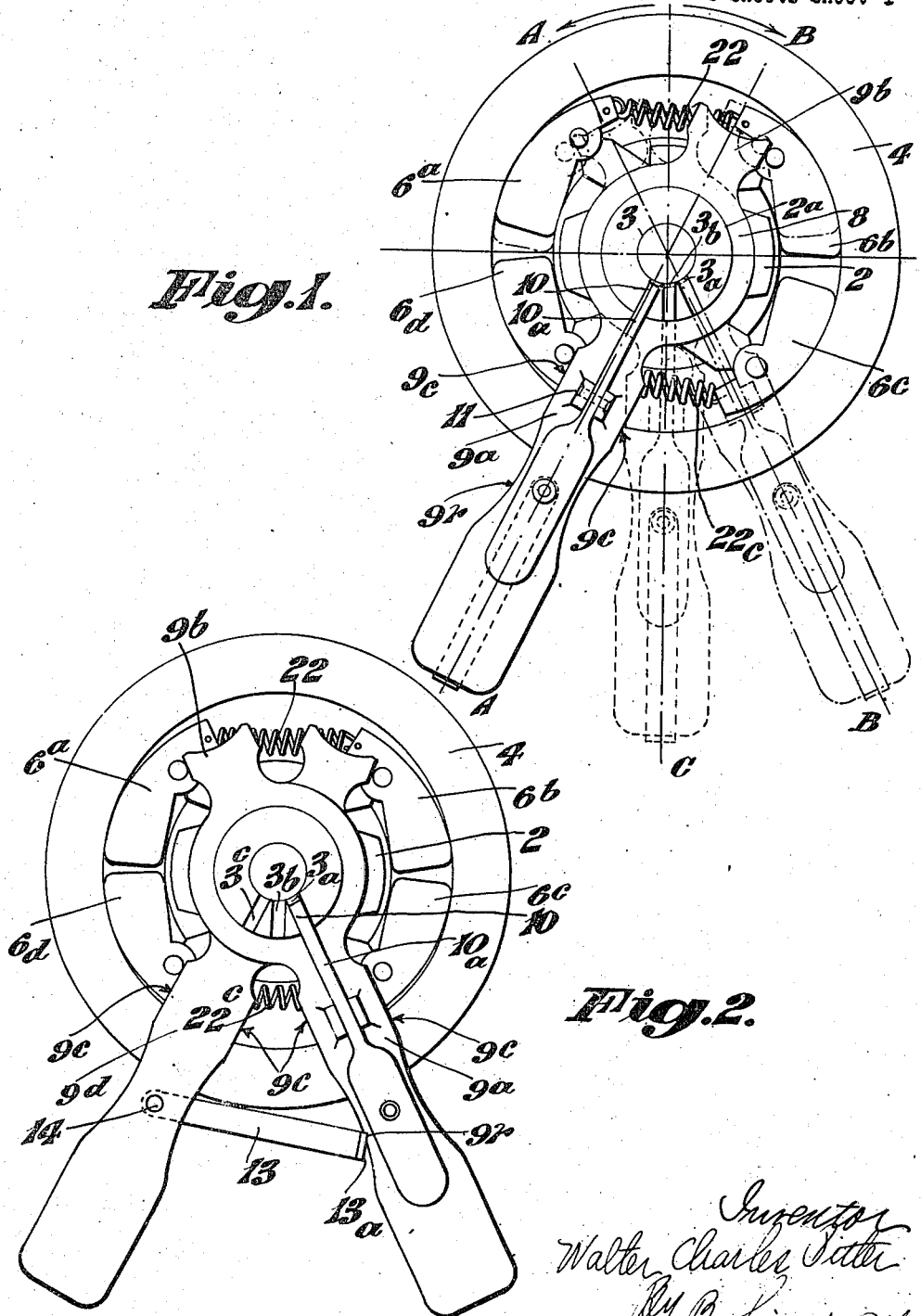

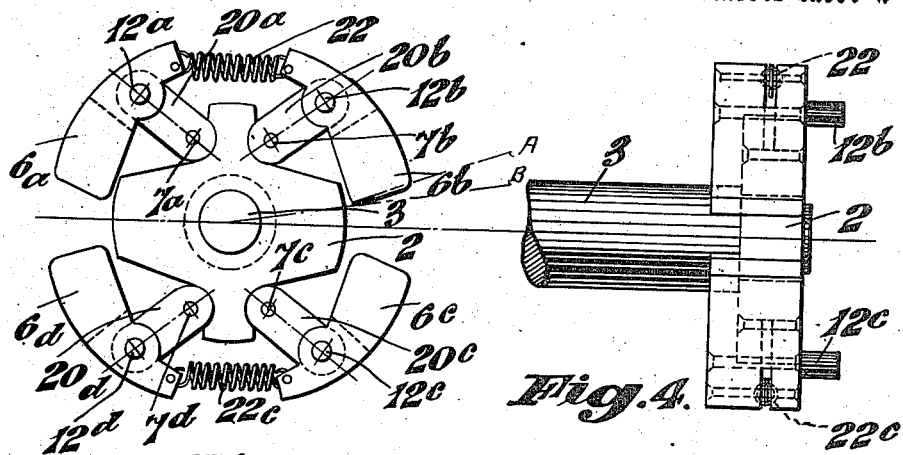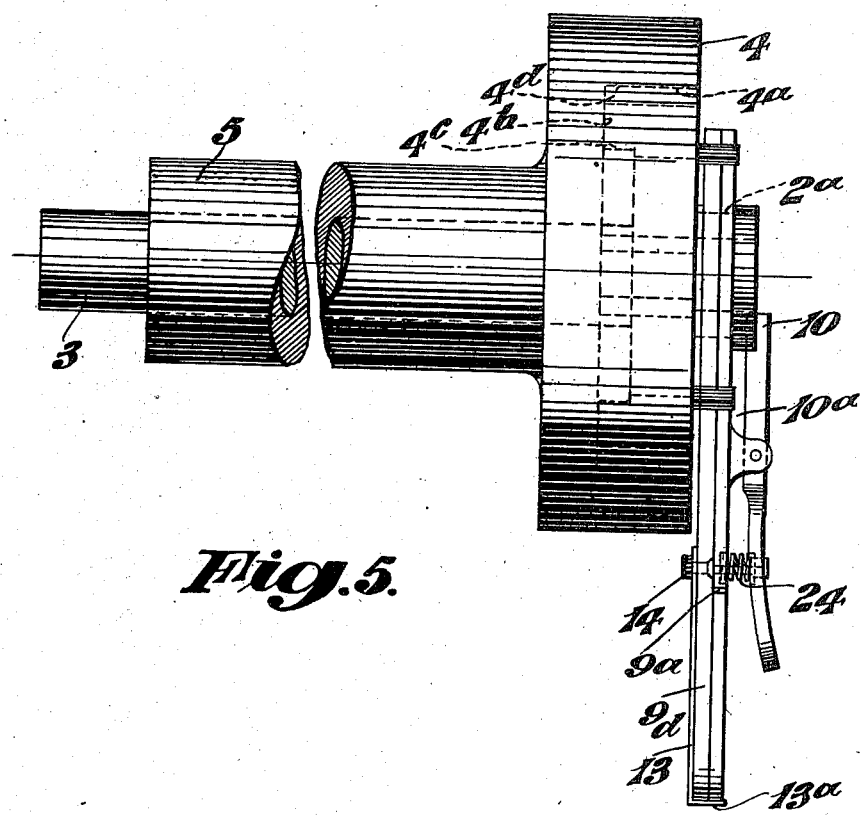

Patented Mar. 27, 1928.

1,664,320

UNITED STATES PATENT OFFICE.

WALTER CHARLES PITTER, OF WEST DULWICH, LONDON, ENGLAND.

CLUTCH FOR TRANSMITTING ROTARY MOTION.

Application filed March 25, 1927, Serial No. 178,448, and in Great Britain March 1, 1926.

This invention relates to rotary clutches of the general type having one or more locking shoes or pawls pivoted on a driving member and adapted to communicate motion in one direction only to a driven member.

Heretofore in a method of detachably keying wheels to shafts wherein are provided two oppositely disposed pivoted cam keys each pressed outwards towards a recess in the wheel by a spring, the adjacent or opposite recesses being so shaped that the cams drive in opposite directions or in one direction only, it has been proposed to tilt the cams out of the driving recesses of the wheels by projections on an axially moving rod thus releasing the wheel, and to provide recesses in the axially moving rod to permit the cams to be moved outwards into the recesses by springs and so enable the wheels to be driven in both directions.

The present invention comprises a clutch of the kind for communicating motion from a rotary or reciprocating member to a rotary member by means of oppositely disposed pairs or series of pairs of spring-controlled pawls having means whereby either or both pawls of each pair can be held out of operation or in operation, wherein either of the pawls of a pair is adapted to be moved into the inoperative position and held there by means of a lever carried by and adapted to be locked to the member carrying the pawls.

In one method of carrying out the invention a lever is pivoted on the member carrying the locking shoes or pawls in such a manner that it can be operated to move either member of an oppositely disposed pair of such shoes or pawls into inoperative position and hold it there. This operating lever may be divided into two portions each adapted to place the shoes or pawls in either the operative or inoperative positions and these two portions may be so constructed that they can be moved over one another to form a single lever and be provided with means for holding them in either the closed or open positions as required.

A manner of carrying out the invention is illustrated by the accompanying drawings wherein Figure 1 is a face view of the clutch, Figure 2 a similar view with two operating levers, Figure 3 a separate view of the clutch shoe or pawl carrier, Figure 4 a side view of Figure 3 and Figure 5 a side view of the complete device.

In these drawings a driving member 3 carries a shoe or pawl carrier 2 and is rotatively mounted in a drum 4 provided with a sleeve 5 forming the driven member.

On the carrier 2 are pivoted by pins $7^a$ and $7^b$, links $20^a$ and $20^b$ and pins $12^a$ and $12^b$ an oppositely disposed pair of shoes $6^a$ and $6^b$, the rear ends of the pair being connected together by a spring 22. At the lower portion of the carrier 2 is provided a similar pair of shoes $6^c$ and $6^d$, and corresponding pivot pins $7^c$, $7^d$, links $20^c$, $20^d$, pivot pins $12^c$, $12^d$ and spring $22^c$.

All the above parts are mounted in a recess $4^a$ in the drum 4, and at the base of this recess is formed a groove $4^b$ of which the inner and outer circumferential portions $4^c$ and $4^d$ are arranged to be engaged by two opposite portions of the large end of a locking shoe when the shoe is tilted through the medium of the carrier 2 and its connecting link. This mechanism is so arranged that the movement of the carrier 2 by the driving shaft 3, will, when the shoes are free, and when rotating in a direction to move the thick end of the shoe forward tilt such end so that it will grip the opposite sides of the groove $4^b$ and so drive the drum 4 and its sleeve or shaft 5.

The enlarged or forward end of each shoe, as for instance the shoe $6^b$, is of greater thickness measured at a line A joining its two opposite points of contact with the inner and outer circumferential portions of the groove $4^b$, of greater thickness than the radial width of the groove $4^b$, and this line A is normally inclined towards a radial line passing through the nearest gripping point of contact. Owing to this construction it is possible to make the links $20^b$ and the shoe $6^b$ of such length that when the shoe $6^b$ is pushed by the driving carrier 2, it is also tilted so that the line between the points of contact is tilted towards the radial line of the groove into the position which it occupies in full lines in Fig. 1, and in this way effects a grip on its opposite sides. And when the carrier 2 is driven in the reverse direction, the line joining the points of contact is tilted in the opposite direction, that is, its inclination to the radial line B is increased, and hence the points of contact of the shoe are moved farther away from the sides of the groove, and in this manner give a free wheel action.

The mechanism shown for holding either of the oppositely disposed pair of shoes 6$^a$ and 6$^b$ or 6$^c$ and 6$^d$ out of operation and leave the other free to be operated by the driver, consists of a lever 9$^a$ having a boss 8 rotatively mounted on a concentric portion 2$^a$ of the carrier 2 or shaft 3.

The lever 9$^a$ is provided with a spring controlled stop 10 formed on the end of a setting lever 10$^a$ pivoted at 11 to the main lever 9$^a$, the stop portion 10 being held by a spring 24 in any of a series of notches 3$^a$, 3$^b$ and 3$^c$ formed in the end of 2$^a$.

The shoes are provided with actuating pins 12$^a$, 12$^b$, 12$^c$ and 12$^d$ adapted to be engaged by extensions on the lever 9$^a$; one of these extensions 9$^b$ is adapted to engage either of the pins 12$^a$ and 12$^b$ of the shoes 6$^a$ and 6$^b$, while the other 9$^c$ is formed on the sides of the lever at such a position as to engage either of the pins 12$^c$ and 12$^d$ of the shoes 6$^c$ and 6$^d$.

When the lever 9$^a$ is moved to position A and the setting lever 10$^a$ operated to place the stop 10 in the notch 3$^c$, the projection 9$^b$ of the lever 9$^a$ will engage the actuating pin 12$^b$ of the shoe 6$^b$ and hold the latter out of engagement with the sides 4$^c$ and 4$^d$ of the groove 4$^b$ so that it will be in the inoperative position and so leave the shoe 6$^a$ to operate as a one-way drive clutch, that is if the driver 3 is rotated in the direction of the arrow A it will cause the shoe 6$^a$ to engage the drum 4 and so rotate the driven shaft 5. The rotation of the shaft 5 is further assisted by the portion 9$^c$ of the lever 9$^a$ engaging the actuating pin 12$^d$ thereby throwing out of operation the shoe 6$^d$ and leaving the shoe 6$^c$ to operate conjointly with the shoe 6$^a$.

In a similar manner when the lever 9$^a$ is moved to position B and so enables the stop 10 to be moved into the notch 3$^a$, the shoes 6$^a$ and 6$^c$ become inoperative while 6$^b$, 6$^d$ are available as one-way clutches for driving the shaft 5 when the driver 3 is rotated in the direction of the arrow B.

When the lever 9$^a$ is moved to position C and so enables the stop 10 to be moved into the notch 3$^b$ the portions 9$^b$ and 9$^c$ of the lever 9$^a$ are held out of engagement with any of the actuating pins 12$^a$, 12$^b$, 12$^c$ and 12$^d$ and so the oppositely disposed pairs of shoes 6$^a$, 6$^b$ and 6$^c$, 6$^d$ operate as positive clutches and enable the driver 3 to drive the driven member 5 in either direction.

In order to provide means for enabling the shoes to not only operate as described above but also to enable the driver 3 and driven member 5 to be free to rotate in either direction and independently of the other, the lever 9$^a$ is divided into two equal portions 9$^a$ and 9$^d$ as shown in Figure 2, each portion being adapted to move over the other and be held by the end 13$^a$ of a setting lever 13 pivoted at 14 to lower member 9$^d$ of the lever 9$^a$ so that these two members 9$^a$ and 9$^d$ can be operated as a single lever as in Figure 1. By this arrangement when both portions 9$^d$ and 9$^a$ of the lever are moved in opposite directions about their common pivot 2$^a$ all the actuating pins 12$^a$, 12$^b$, 12$^c$ and 12$^d$ are engaged in such a manner as to hold all the shoes 6$^a$, 6$^b$, 6$^c$ and 6$^d$ in the inoperative position and so leave the two members 3 and 5 free to be rotated in either direction independently of each other. In order to hold the levers 9$^a$ and 9$^d$ in such extended position the end of the setting link 13 is arranged to spring into a recess 9$^r$ in the side of the lever 9$^a$.

The shoes may be of the kind described in specification of application Serial No. 738,829 and arranged to operate in a similar manner.

By connecting these radial levers to a hand wheel rim, they can be operated at any angular position of the clutch.

A clutch made in accordance with the present invention may be used in cases where the driving member is given an oscillatory movement as well as in cases where the driver is given a continuous movement.

What I claim and desire to secure by Letters Patent is:—

1. A clutch of the kind for transmitting motion from a rotary or reciprocating member to a rotary member, comprising a pair of oppositely disposed one way friction grip pawls, a main driving member associated with a main driven member, a connecting link for each pawl, each pawl being pivoted at one end of its connecting link, the other end of the connecting link being pivoted to one of the main members, while the other main member has a concentric groove in which the gripping ends of the pair of pawls operate in opposite directions, and means for moving either of the pawls of the pair into an inoperative position and holding it there.

2. A clutch of the kind for transmitting motion from a rotary or reciprocating member to a rotary member, comprising a pair of oppositely disposed one way friction grip pawls, a main driving member coaxially associated with a main driven member, a connecting link for each pawl, each pawl being pivoted at one end to one end of its connecting link the other end of its connecting link being pivoted to one of the main members, while the other main member has an annular groove of which the inner and outer circumferential surfaces form gripping surfaces for the opposite sides of the gripping ends of each pawl, the free end of each pawl having a pair of oppositely disposed gripping surfaces of which the distance apart is greater than the radial width of the groove, and means provided for moving either of the pawls of the pair into an inoperative position and holding it there.

3. A clutch of the kind for transmitting motion from a rotary or reciprocating member to a rotary member, comprising a pair of oppositely disposed one-way friction grip pawls, a main driving member coaxially associated with a main driven member, a connecting link for each pawl, an operating lever and means for holding the same in one position to render a pawl operative and another to render it inoperative, each pawl being pivoted at one end to one end of its connecting link the other end of its connecting link being pivoted to one of the main members, while the other main member has an annular groove of which the sides are engaged by the gripping ends of the pawls, the operating lever being concentrically pivoted to the pawl carrying member and so that when turned to one position it engages one of the pair of oppositely disposed pawls and holds it in the inoperative position, while leaving the other pawl free to engage the opposite sides of the annular groove of the grooved member or not according to the direction of rotation.

4. A clutch of the kind for transmitting motion from a rotary or reciprocating member to a rotary member, comprising a pair of oppositely disposed one-way friction grip pawls, a main driving member coaxially associated with a main driven member, a connecting link for each pawl, a pawl controlling spring, each pawl being pivoted at one end to one end of its connecting link the other end of its connecting link being pivoted to one of the main members, while the other main member has an annular groove of which the inner and outer circumferential surfaces form gripping surfaces for the opposite sides of the gripping ends of each pawl, the free end of each pawl having a pair of oppositely disposed gripping surfaces of which the distance apart is greater than the radial width of the groove, the rear ends of the pair of pawls being connected together by the spring, and means provided for moving either of the pawls of the pair into an inoperative position and holding it there.

5. A clutch of the kind for transmitting motion from a rotary or reciprocating member to a rotary member, comprising a pair of oppositely disposed one-way friction grip pawls, a main driving member coaxially associated with a main driven member, a connecting link for each pawl, an operating lever and means for holding the same in one position to render a pawl operative and in another to render it inoperative, a pawl controlling spring, each pawl being pivoted at one end to one end of its connecting link the other end of its connecting link being pivoted to one of the main members, while the other main member has an annular groove of which the sides are engaged by the gripping ends of the pawls, the operating lever being concentrically pivoted to the pawl carrying member and so that when turned to one position it engages one of the pair of oppositely disposed pawls and holds it in the inoperative position, while leaving the other pawl free to engage the opposite sides of the annular groove of the grooved member or not according to the direction of rotation, the rear ends of the pair of pawls being connected together by the spring at positions beyond their pivots.

6. A clutch of the kind for transmitting motion from a rotary or reciprocating member to a rotary member, comprising two pairs of oppositely disposed one way friction grip pawls, a main driving member coaxially associated with a main driven member, a connecting link for each pawl, an operating lever, each pawl being pivoted at one end to one end of its connecting link the other end of its connecting link being pivoted to one of the main members, while the other main member has an annular groove in which the gripping ends of the pawls operate, the operating lever being pivoted to one of the main members so that it will when moved to one position engage at one side of its pivot and hold out of operation one member of one pair of pawls and at the same time engage at the other side of its pivot and hold out of operation one member of the other pair of pawls, and when the lever is moved to another position the lever will engage and hold out of operation the other members of each pair of pawls, means being provided for holding the lever in either position.

7. A clutch of the kind for transmitting motion from a rotary or reciprocating member to a rotary member, comprising a pair of oppositely disposed one way friction grip pawls, a main driving member coaxially associated with a main driven member having an annular groove in which the gripping ends of the pawls operate, a connecting link for each pawl pivoted at one end to the rear end of the pawl and at the other to one of the main members, a pair of operating levers one arranged to move to and hold one pawl of the pair in the inoperative position, the other lever being arranged to move to and hold the other pawl of the pair in the inoperative position and means whereby both levers can be fixed in such positions.

In witness whereof I affix my signature.

WALTER CHARLES PITTER.